(12) United States Patent
Conrad

(10) Patent No.: US 8,505,867 B2
(45) Date of Patent: Aug. 13, 2013

(54) PORTABLE, LIGHTWEIGHT MOUNT FOR A SATELLITE ANTENNA SYSTEM

(75) Inventor: Timothy John Conrad, Mount Pleasant, IA (US)

(73) Assignee: Winegard Company, Burlington, IA (US)

( * ) Notice: Subject to any disclaimer, the term of this patent is extended or adjusted under 35 U.S.C. 154(b) by 90 days.

(21) Appl. No.: 13/038,942

(22) Filed: Mar. 2, 2011

(65) Prior Publication Data

US 2011/0215206 A1    Sep. 8, 2011

Related U.S. Application Data

(60) Provisional application No. 61/309,970, filed on Mar. 3, 2010.

(51) Int. Cl.
*F16M 11/38* (2006.01)

(52) U.S. Cl.
USPC ........ 248/431; 248/159; 248/163.1; 248/170; 248/177.1; 343/882; 343/881; 343/880

(58) Field of Classification Search
USPC ................. 248/688, 670, 646, 460, 462, 463, 248/464, 469, 371, 396, 159, 163.1, 164, 248/431, 166, 434, 435, 170, 439, 177.1, 248/176.3, 188, 188.1, 188.6, 188.7, 188.8; 343/882, 881, 880
See application file for complete search history.

(56) References Cited

U.S. PATENT DOCUMENTS

| 729,291 | A | * | 5/1903 | Dickerson | 248/177.1 |
| 2,653,000 | A | * | 9/1953 | Cadwell et al. | 248/168 |

(Continued)

OTHER PUBLICATIONS

Cobham plc, Flyaway VSAT Antenna Systems [online], [retrieved on Feb. 22, 2010]. Retrieved from the Internet <URL: http://www.cobham.com/about-cobham/avionics-and-surveillance/abou...>.

(Continued)

*Primary Examiner* — Terrell McKinnon
*Assistant Examiner* — Michael McDuffie
(74) *Attorney, Agent, or Firm* — Dorr, Carson & Birney PC

(57) ABSTRACT

A mount for mobile electronic devices such as a satellite dish antenna system. The mount includes a tripod and an elongated post member supported on it by a universal joint or pivot mechanism. The post member extends along a longitudinal axis and the pivot mechanism allows the post member to be moved about two, substantially perpendicular pivotal axes relative to the tripod to align the longitudinal axis of the post member with the vertical. Once the axis of the post member is aligned vertically, the alignment system of the attachable satellite dish will then have a proper reference from which to aim or direct the dish (e.g., azimuth and elevation) for best reception and transmission. The mount includes an arrangement of cables extending between the tripod legs and adjustable straps extending between each tripod leg and the post member to provide a very strong and stable support for the satellite dish antenna system that is attachable to the upper end of the vertically aligned post member. The tripod is designed to be foldable into a compact configuration for easy transport and storage with each tripod leg folded onto itself and positioned under a central member of the tripod. The folding and unfolding of the tripod and the alignment of the post member to the vertical on it can all be done by one person without the need for any tools.

11 Claims, 13 Drawing Sheets

(56) References Cited

U.S. PATENT DOCUMENTS

| | | | |
|---|---|---|---|
| 2,668,682 A | | 2/1954 | Dalton |
| 2,832,555 A | * | 4/1958 | Terhune ............... 248/170 |
| 3,838,838 A | * | 10/1974 | Seaman, Jr. .......... 248/537 |
| 4,146,897 A | * | 3/1979 | Wilson et al. ........ 343/882 |
| 4,404,565 A | * | 9/1983 | Gurney et al. ........ 343/881 |
| 4,454,515 A | | 6/1984 | Major et al. |
| 4,626,864 A | | 12/1986 | Micklethwaite |
| 4,832,296 A | * | 5/1989 | Schnepp ............... 248/168 |
| 4,994,816 A | | 2/1991 | Kondo |
| 5,077,560 A | | 12/1991 | Horton et al. |
| 5,308,029 A | * | 5/1994 | Bingham .............. 248/159 |
| 5,363,116 A | * | 11/1994 | Allen ................... 343/881 |
| 5,576,722 A | * | 11/1996 | Bustillos .............. 343/882 |
| 5,646,638 A | | 7/1997 | Winegard |
| 5,660,366 A | | 8/1997 | Palmer |
| 5,760,751 A | | 6/1998 | Gipson |
| 5,945,961 A | | 8/1999 | Price et al. |
| 6,450,464 B1 | * | 9/2002 | Thomas ............... 248/168 |
| 6,462,718 B1 | * | 10/2002 | Ehrenberg et al. ... 343/880 |
| 6,682,029 B1 | * | 1/2004 | Dierkes ............... 248/165 |
| 6,734,830 B1 | | 5/2004 | Bickham |
| 7,137,608 B2 | * | 11/2006 | Willey ................. 248/519 |
| 7,218,289 B2 | | 5/2007 | Trajkovic |
| 7,369,097 B1 | | 5/2008 | Sherwood |
| 7,397,435 B2 | | 7/2008 | McEwan |
| 8,319,697 B2 | | 11/2012 | Conrad |

OTHER PUBLICATIONS

SAT-LITE technologies, 2422 Celero—2.4 Meter Flyaway Antenna [online], [retrieved on Feb. 22, 2010]. Retrieved from the Internet <URL: http://sat-litetech.com/slt_celeropg.html>.

* cited by examiner

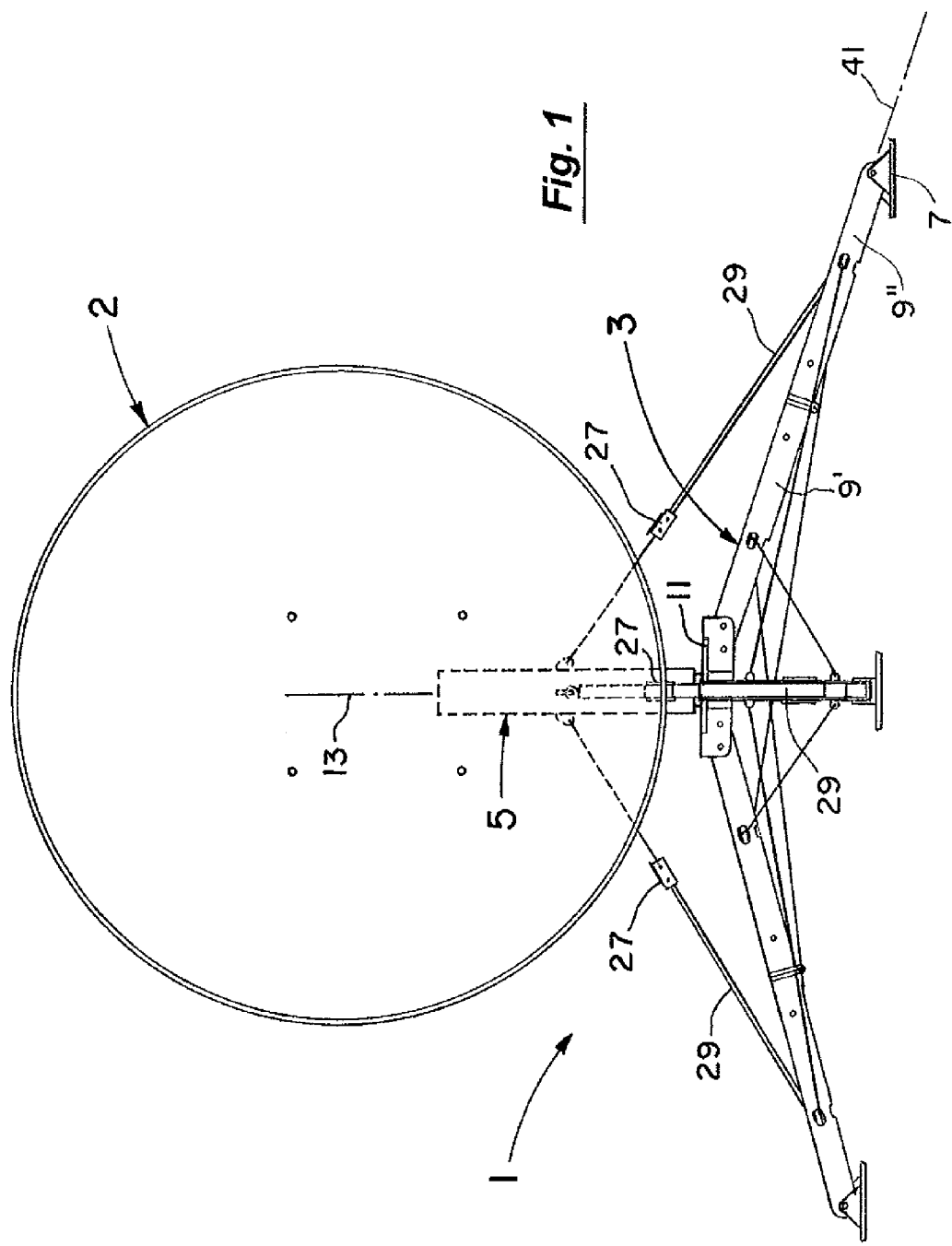

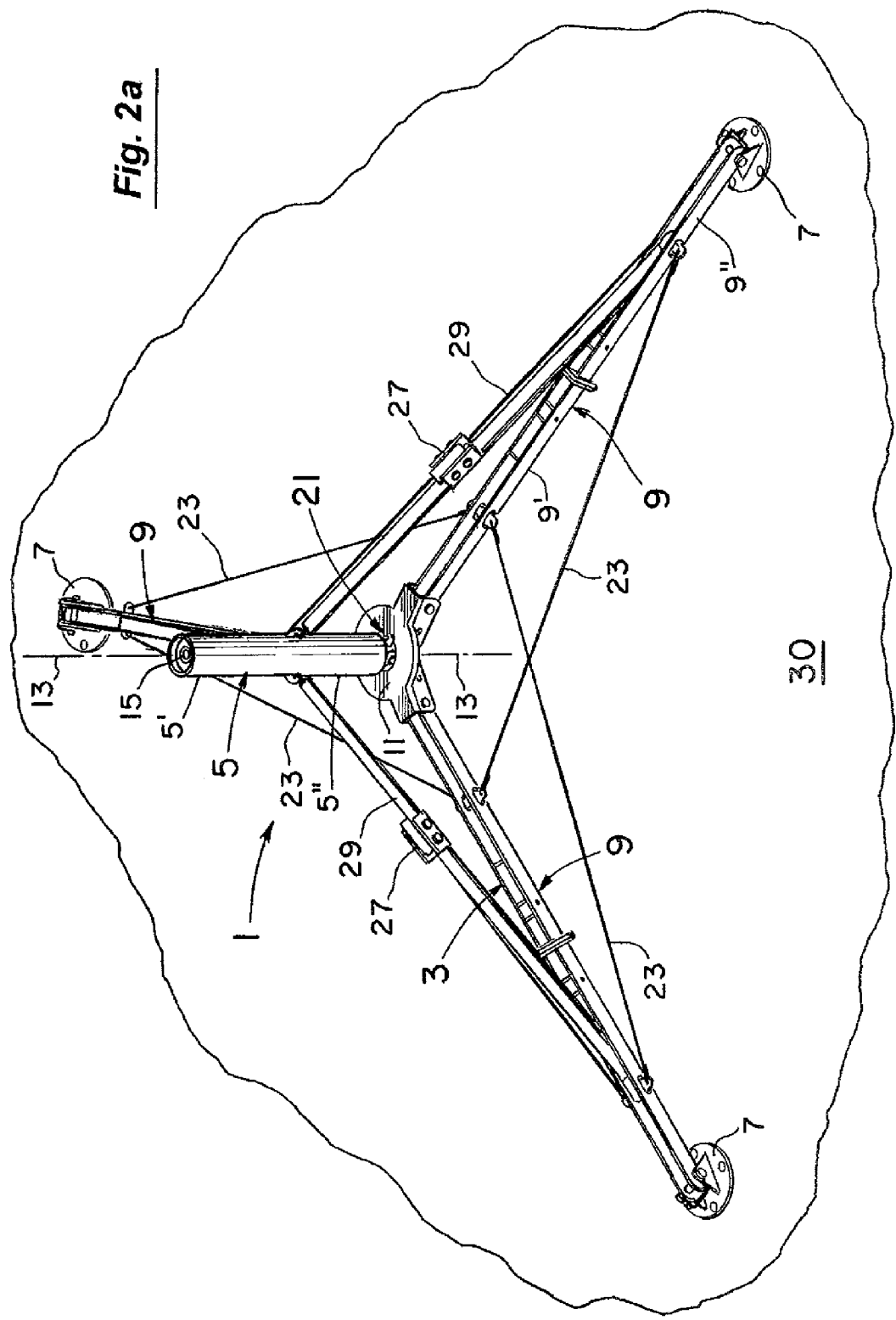

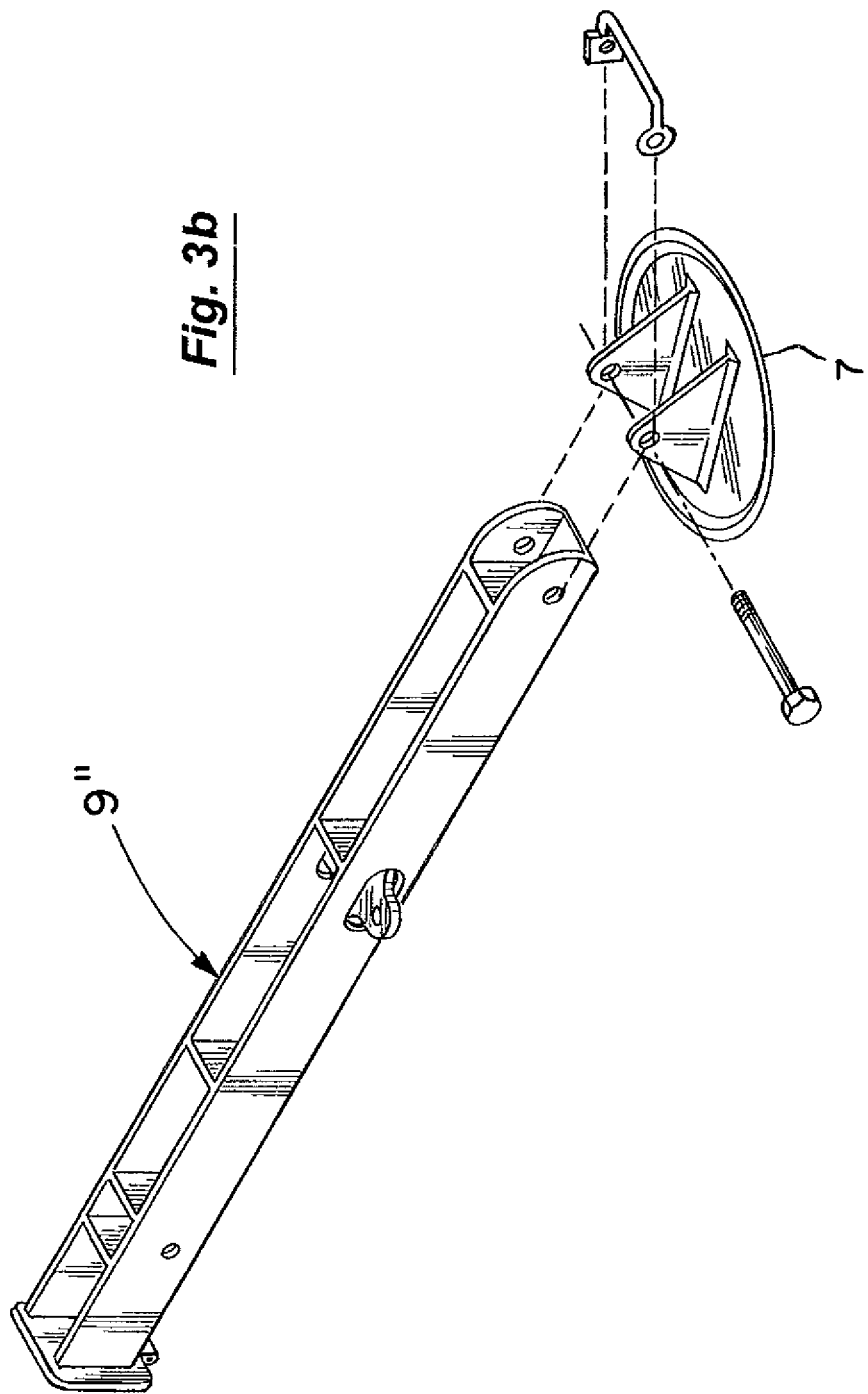

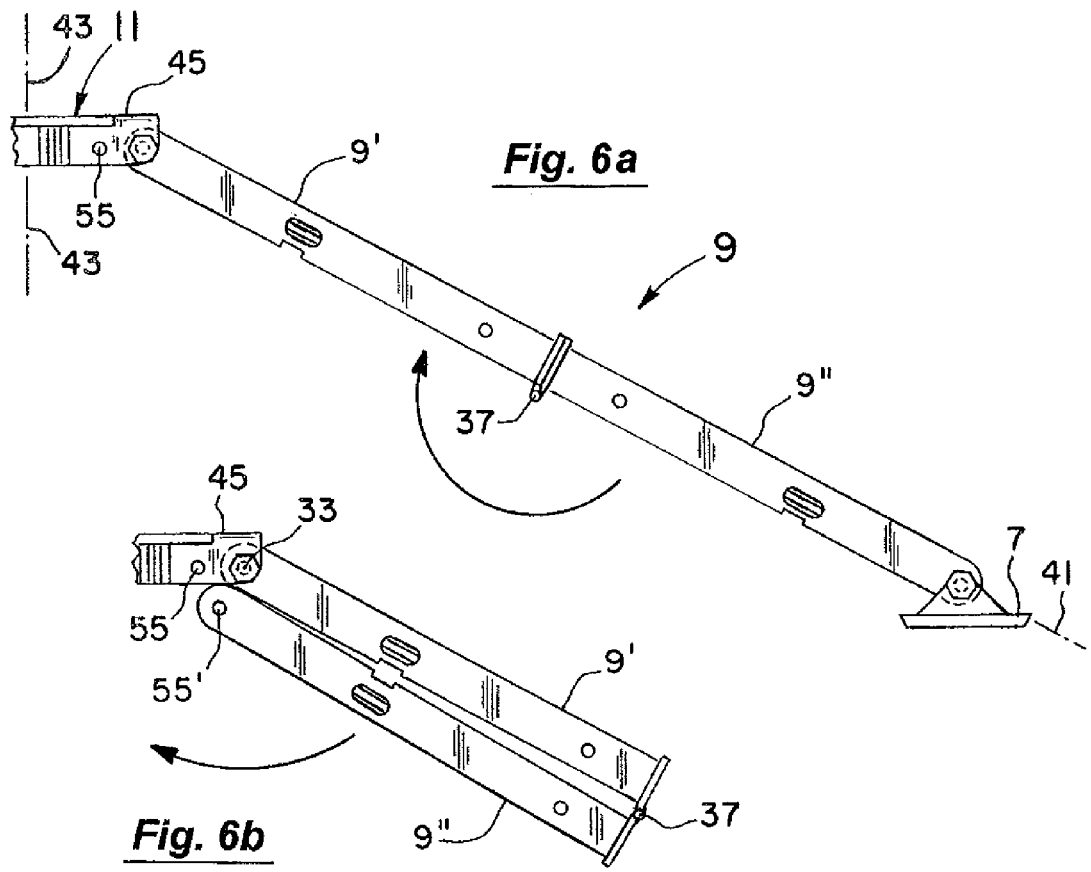
*Fig. 6a*
*Fig. 6b*
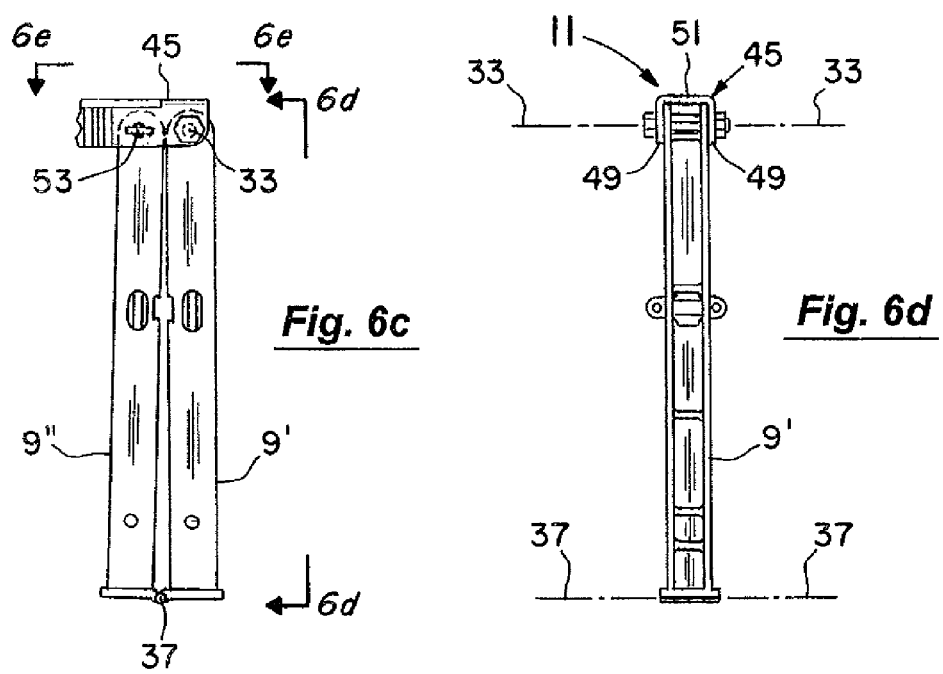
*Fig. 6c*
*Fig. 6d*

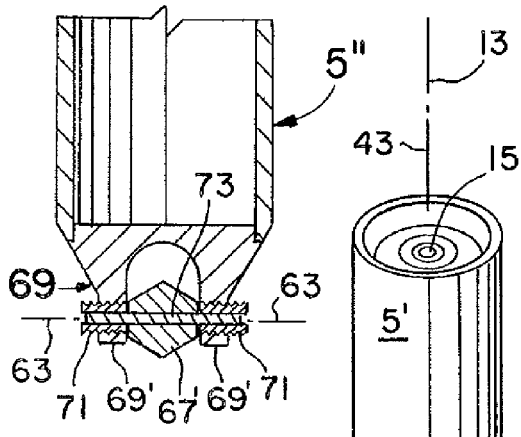
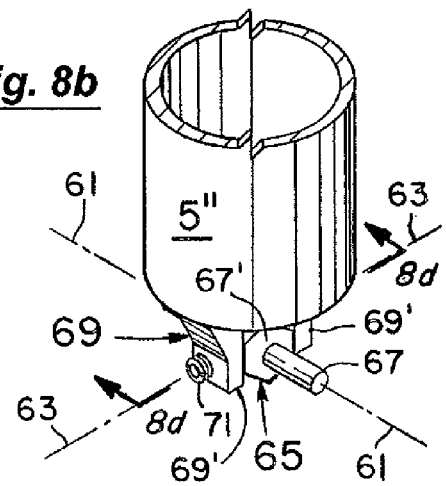
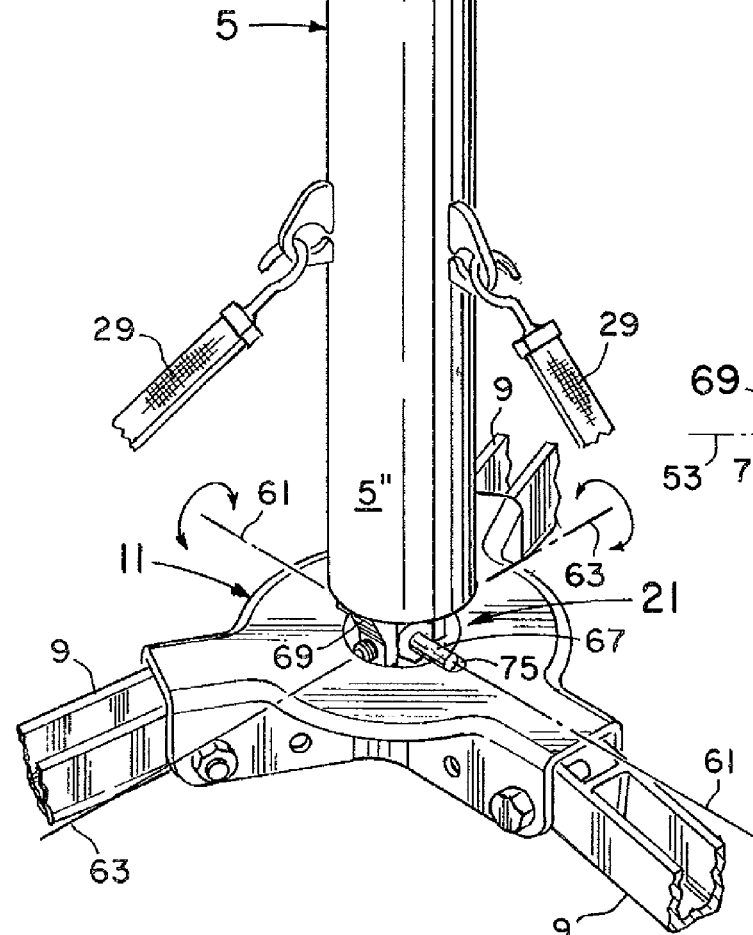
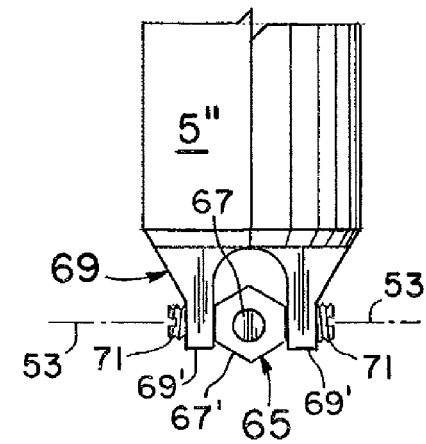
Fig. 8d
Fig. 8b
Fig. 8c
Fig. 8a

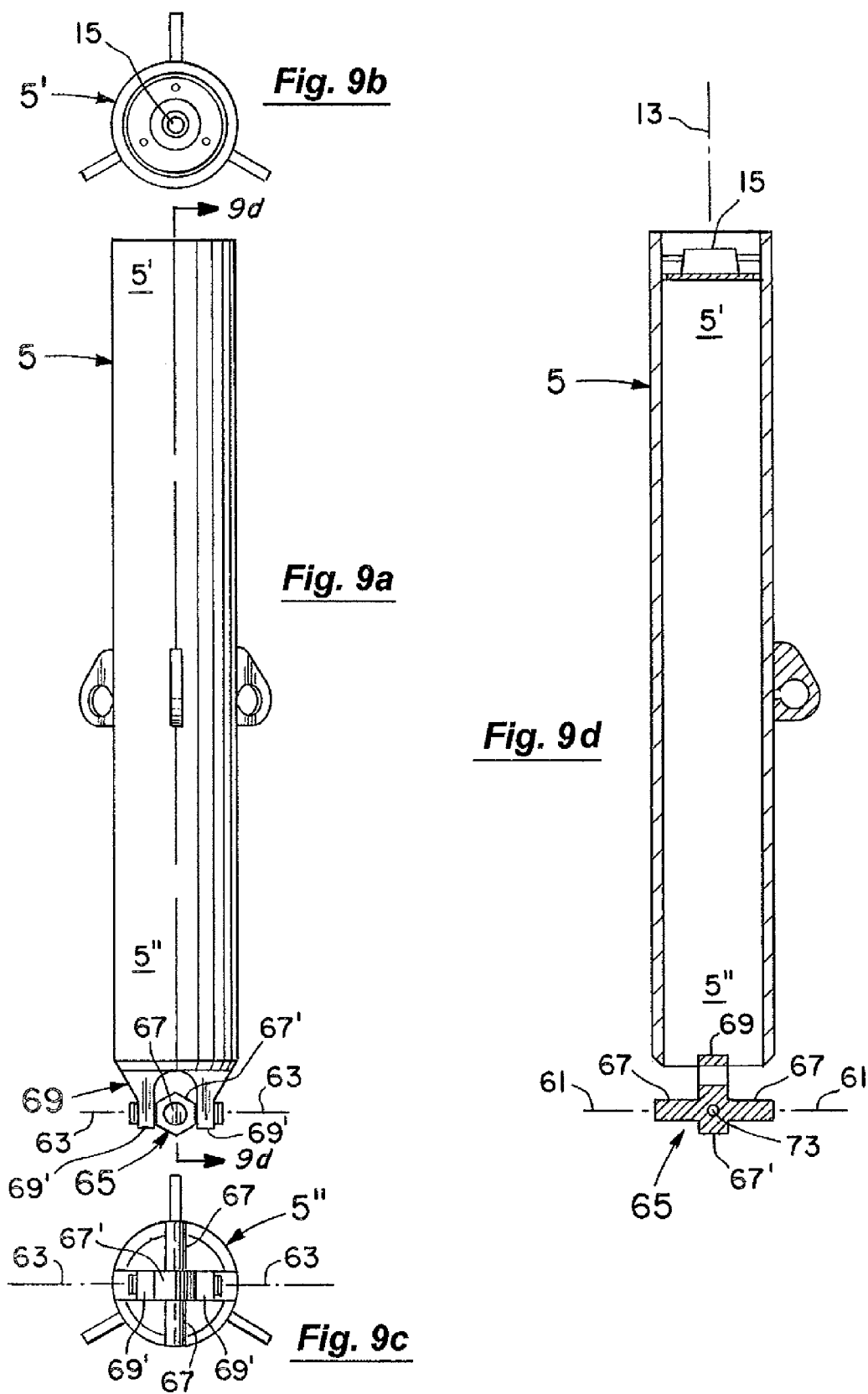

PORTABLE, LIGHTWEIGHT MOUNT FOR A SATELLITE ANTENNA SYSTEM

RELATED PATENT APPLICATIONS

This application claims the benefit of U.S. Provisional Patent Application Ser. No. 61/309,970 filed Mar. 3, 2010, which is incorporated herein by reference.

BACKGROUND OF THE INVENTION

1. Field of the Invention

This invention relates to field of portable, lightweight mounts for mobile electronic devices such as satellite antenna systems and more particularly to the field of such mounts that can be easily assembled for use at a variety of rugged and remote locations and easily leveled on severe and uneven surfaces for use.

2. Discussion of the Background

Customers, especially business customers, continually require a lower cost, lightweight, and portable mount for mobile electronic devices such as automatic satellite acquisition antenna systems wherein the mount can be easily assembled and disassembled at remote locations. Such antenna systems are commonly referred to as "flyaway" due to their lightweight and compactness during transport and quick deployment in the field in use. Such antenna systems including their mounts in particular need to be rugged and durable in harsh environmental conditions. They also need to be able to be carried and quickly deployed in a short amount of time by one person on surfaces that are often very rough and uneven.

In the past, a number of portable and collapsible satellite antenna systems have been patented. For example, U.S. Pat. Nos. 7,369,097 and 5,660,366 show portable dish antennas supported by collapsible mounts. U.S. Pat. No. 5,646,638 provides a portable and collapsible satellite dish antenna system that can be manually carried from one location to another. U.S. Pat. No. 6,734,830 shows a portable adjustable mount for a satellite dish antenna using a stand having a pair of parallel spaced, laterally adjustable longitudinal brackets. As indicated above, it is desirable that such satellite antenna systems can be disassembled and/or folded into compact configurations for easy transport either manually or in protective cases, backpacks, or duffle bags. In this regard, U.S. Pat. No. 7,397,435 shows a quick release stowage system for transporting a mobile satellite antenna. U.S. Pat. No. 7,218,289 also shows a portable microwave reflector antenna that can be stowed in two hard-shelled, airline cases.

Some prior approaches use ballast to stabilize the deployed portable and collapsible satellite antenna system especially when the deployed system is used for an extended period of time. U.S. Pat. Nos. 6,682,029 and 5,760,751 in this regard show collapsible satellite dish antenna mounts having hollow base containers for holding such ballast.

A continuing need exists for flyaway mounts for mobile electronic devices such as satellite antennas that are easily assembled and disassembled as well as lightweight and compact for transport and that can be quickly leveled on severe and uneven surfaces, all without the use of tools. A further need exists for such a satellite system that can be carried and deployed by one person.

SUMMARY OF THE INVENTION

The present invention involves a mount for mobile electronic devices such as a satellite dish antenna system. The mount includes a tripod and an elongated post member supported on it by a universal joint or pivot mechanism. The post member extends along a longitudinal axis and the pivot mechanism allows the post member to be moved about two, substantially perpendicular pivotal axes relative to the tripod to align the axis of the post member with the vertical. Once the longitudinal axis of the post member is aligned vertically, the alignment system of the attachable satellite dish will then have a proper reference from which to aim or direct the dish (e.g., azimuth and elevation) for best reception and transmission. The mount can be used on rough and inclined surfaces wherein the post member can be easily and quickly adjusted relative to the tripod up to about plus/minus 30 degrees. The mount includes an arrangement of cables extending between the tripod legs and adjustable straps extending between each tripod leg and the post member to provide a very strong and stable support for the satellite dish antenna system that is attachable to the upper end of the vertically aligned post member.

The tripod of the present invention is designed to be foldable into a compact configuration for easy transport and storage. The tripod has three legs with respective upper and lower leg sections pivotally mounted to each other. The legs extend outwardly of a central member of the tripod with the upper section of each leg pivotally mounted to the central member. Each upper leg section at the pivotal axis is received with an inverted, U-shaped portion of the central member. In operation to collapse the tripod, the lower leg section can be pivoted relative to the upper leg section to a position substantially adjacent and parallel to it. The adjacent leg sections can then be pivoted together so that the free end of the lower leg section is also received in the inverted, U-shaped portion of the central member. A locking pin can thereafter be inserted if desired through aligned apertures in the walls of the U-shape and the free end of the lower leg section to hold the folded leg securely in place. The folding and unfolding of the tripod and the alignment of the post member to the vertical on it can all be done by one person without the need for any tools.

BRIEF DESCRIPTION OF THE DRAWINGS

FIG. 1 is a front elevational view of the mount of the present invention with a satellite dish antenna system attached to it.

FIG. 2(a) is a perspective view of the mount of the present invention showing its tripod and post member on which the satellite dish antenna system is attachable.

FIG. 2b is a plan view of the mount of FIG. 2a.

FIG. 3b is an exploded view of the lower leg section of FIG. 3a.

FIGS. 6a-6f sequentially illustrate how the legs of the tripod of the present invention can be quickly and easily folded into a compact configuration for transport or storage.

FIGS. 8a-8d illustrate details of the universal joint or pivot mechanism for adjusting and supporting the longitudinal axis of the post member in a vertical position on the tripod.

FIGS. 9a-9d illustrate further details of the elongated post member.

DETAILED DESCRIPTION OF THE INVENTION

Figure 2B:
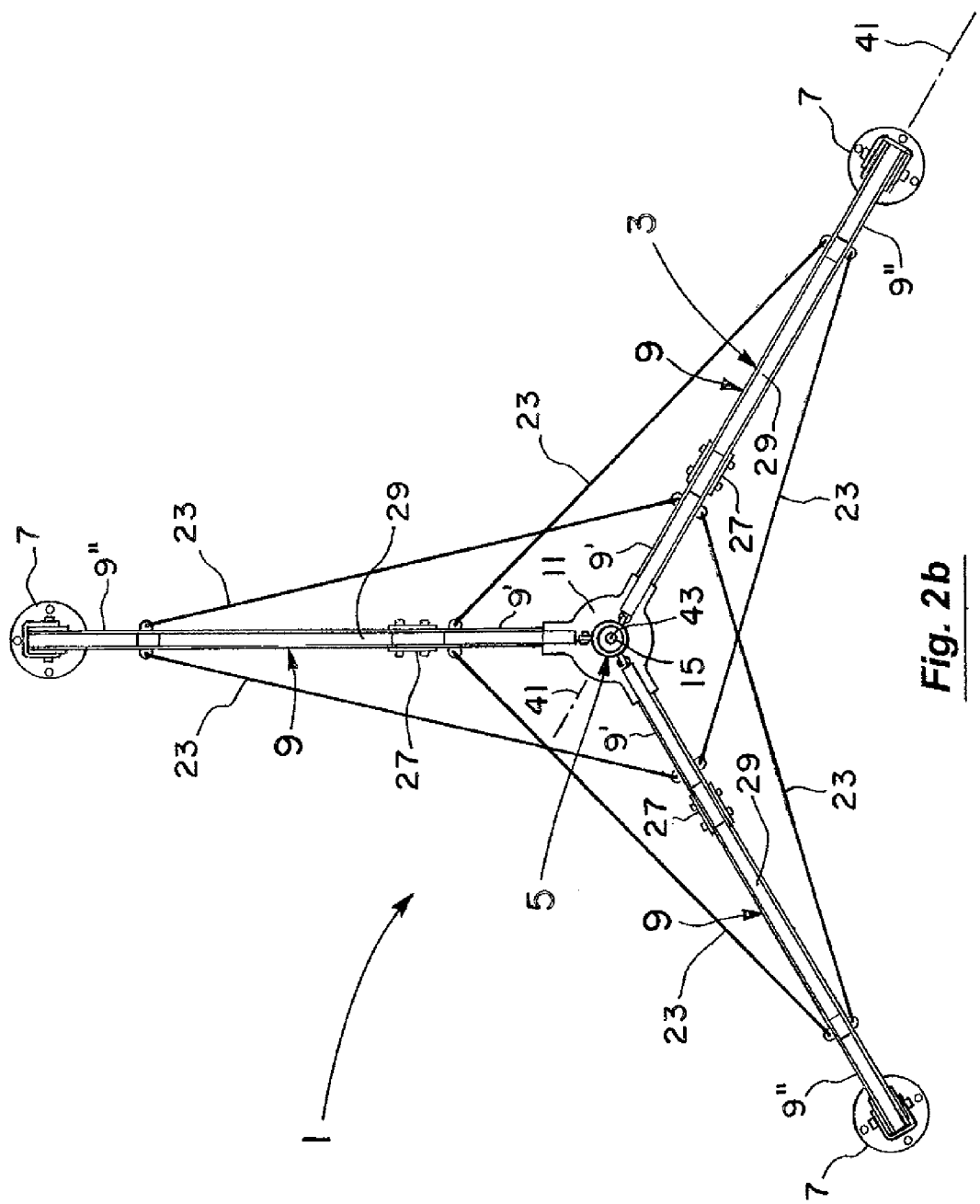

FIG. 1 illustrates the mount 1 of the present invention in use supporting a satellite dish system having a dish antenna 2. The mount 1 includes a tripod 3 (see also FIGS. 2a and 2b) and an elongated post member 5 which is removably supported on the tripod 3. The tripod 3 itself has three foot pads 7 (see FIGS. 2a and 2b), three elongated support legs 9, and a central member 11. The elongated post member 5 in use is then supported on the central member 11 of the tripod 3 as shown. The elongated post member 5 extends along a longitudinal axis 13 as in FIGS. 1 and 2a between upper and lower sections 5' and 5" (FIG. 2a). The upper section 5' has a built-in bubble level at 15 (FIG. 2a) and the lower section 5" has a universal joint or pivot mechanism at 21. As explained in more detail below, the universal joint or pivot mechanism at 21 allows the post member 5 to be pivoted relative to the central member 11 of the tripod 3 about two, substantially perpendicular axes to virtually any desired position to level it.

The support legs 9 of the tripod 3 are firmly held in their operating, deployed positions of FIGS. 1-2b by the triangular configurations of the six cables 23 (see FIG. 2b). As shown, the six cables 23 extend among the legs 9 and provide a very stable arrangement for holding the tripod 3 in place. As discussed in more detail below, the elongated post member 5 can then be universally moved relative to the central member 11 of the tripod 3 to level it and held in place by adjusting the lengths at 27 of the flexible straps 29 of FIGS. 1-2b. In operation and depending upon how level or unlevel the surface 30 is in FIG. 2a, the elongated post member 5 can be easily and quickly adjusted (e.g., up to about plus/minus 30 degrees) so that its longitudinal axis 13 is essentially vertical. Once the axis 13 of the post member 5 is vertical, the alignment system of the attachable satellite dish 2 will then have a proper reference from which to aim or direct the dish 2 (e.g., azimuth and elevation) for best reception and transmission. The adjustable, elongated members 29 are shown as and are preferably flexible straps but could be other adjustable length members such telescoping pieces if desired.

Figure 3A:
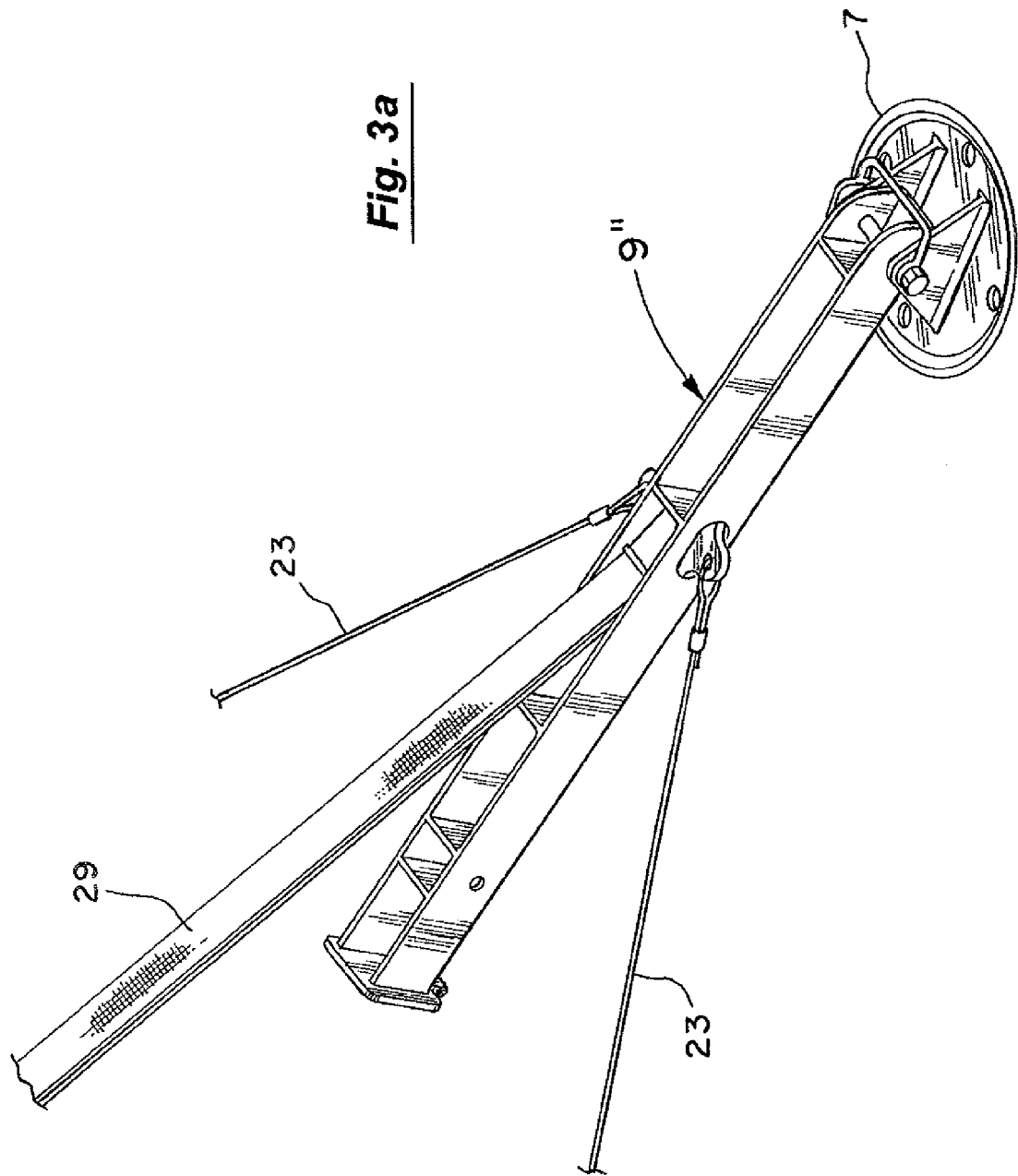
FIG. 3a is a perspective view of the lower section of a leg of the tripod.
Figure 4:
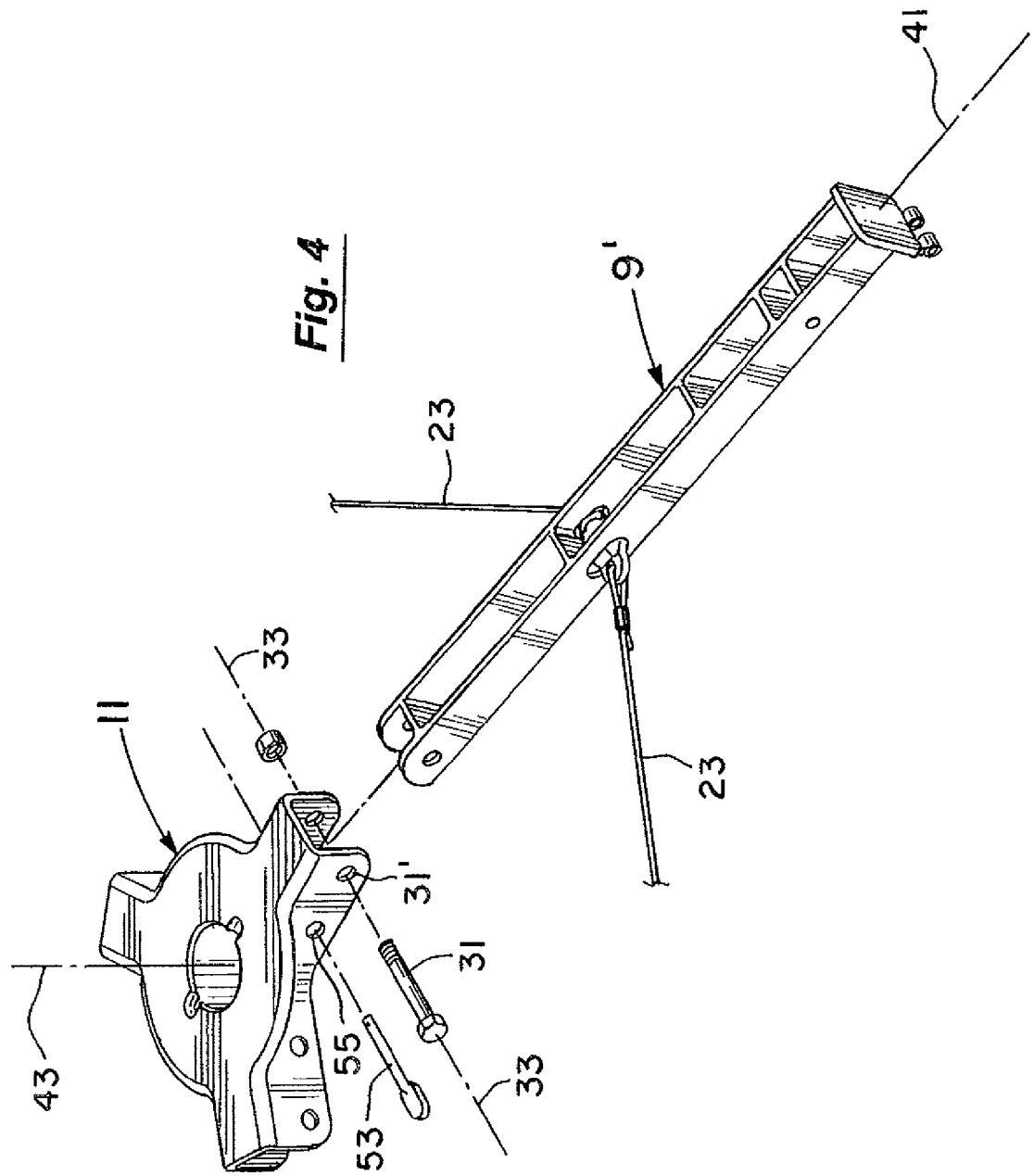
FIG. 4 is a perspective view of the upper section of a leg of the tripod and the central member of the tripod to which the upper leg section is pivotally attached.
Figure 5:
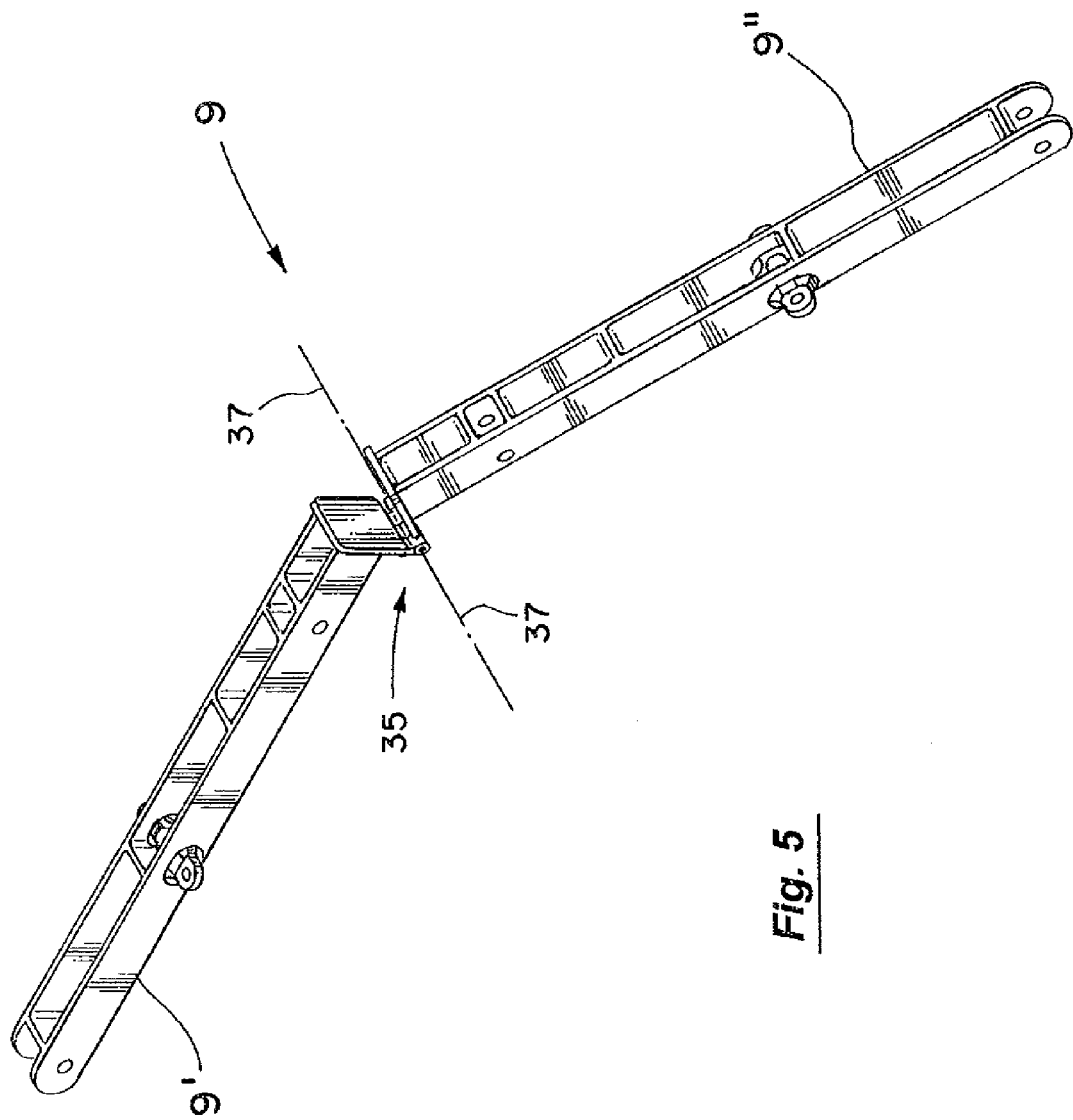
FIG. 5 is a perspective view of a leg of the tripod showing the upper and lower sections of it that are pivotally mounted to each other.

Each support leg 9 for the tripod 3 of FIGS. 2a and 2b has an upper and lower section 9',9" (see also FIG. 1). Each lower section 9" as perhaps best seen in FIGS. 3a and 3b has one of the foot pads 7 pivotally attached to it along with two of the cables 23 (FIG. 3a) and one of the adjustable straps 29. The upper section 9' as shown in FIG. 4 also has two of the cables 23 attached to it and can be pivotally mounted to the central member 11 of the tripod 3 by the pin 31 received in aperture 31' for pivotal movement about the axis 33. The upper and lower leg sections 9',9" are mounted to each other by a hinge arrangement at 35 (see FIG. 5) for pivotal movement relative to each other about the axis 37. In the deployed position of FIGS. 1-2b, at least two cables 23 as best seen in FIG. 2b are respectively run from the lower leg section 9" of each leg 9 to the upper leg section 9' of the adjacent legs 9 to firmly hold the tripod 3 in position.

For transport, the tripod 3 of FIGS. 1-2b can be folded into a relatively small and compact configuration as illustrated in FIGS. 6a-6f. More specifically, each leg 9 in its deployed position of FIGS. 2b and 6a extends along an axis 41 outwardly of the central axis 43 of the central member 11 of the tripod 3. In one folding procedure, the foot pad 7 of FIG. 6a can be first removed and the lower leg section 9" pivoted about the hinge axis 37 to be substantially adjacent and parallel to the upper leg section 9' as in FIG. 6b. It is noted that in FIGS. 6a and 6b as well as FIGS. 6c-6f, the cables 23 and straps 29 are not shown for clarity but normally they remain attached to the tripod 3 to eliminate or at least reduce the number of free pieces. In any event and from the position of FIG. 6b, the upper and lower leg sections 9',9" can thereafter be pivoted together about the axis 33 to the position of FIG. 6c.

Figure 6E:
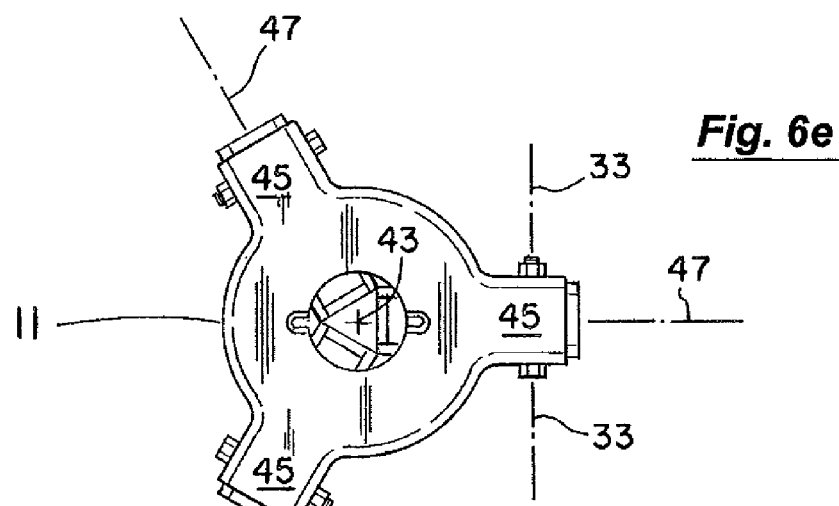
Figure 6F:
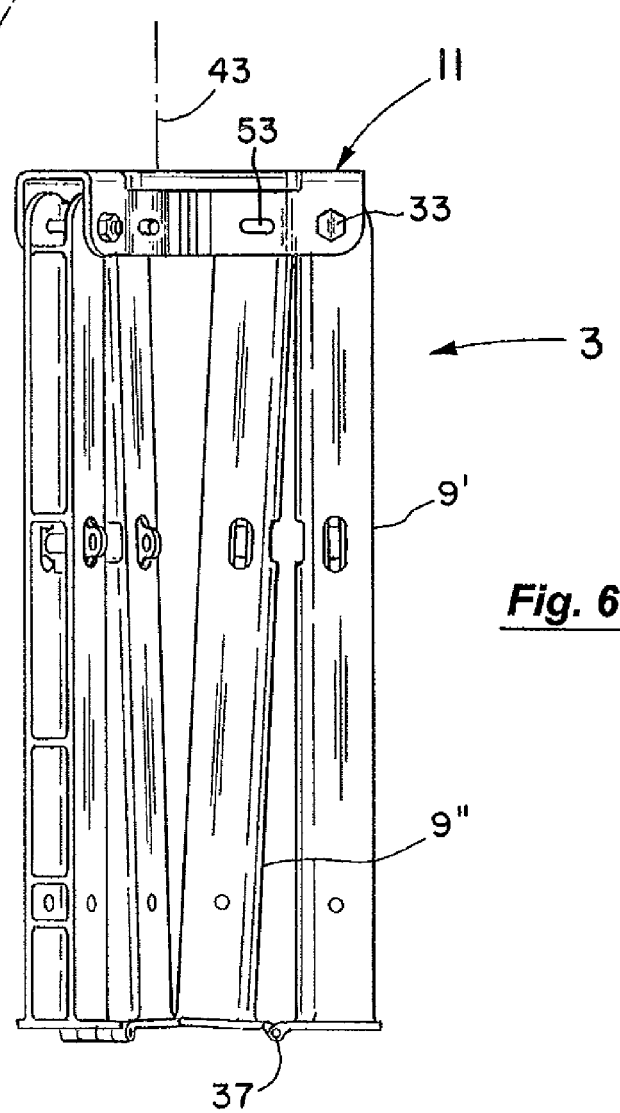

In the position of FIG. 6c and as illustrated in the side view of FIG. 6d, the upper leg section 9' at the pivot 33 and the free end of the folded, lower leg section 9" behind it in FIG. 6d are both received in an arm portion 45 of the central member 11 of the tripod 3. In this regard, the central member 11 of the tripod 3 as best seen in FIG. 6e has three arm portions 45 that extend outwardly of the central axis 43 of the central member 11 along respective axes 47. The axes 47 are spaced from each other substantially 120 degrees about the central axis 43 and each arm portion 45 preferably has a cross section in the shape of an inverted U as perhaps best seen in FIG. 6d. The inverted U-shape is formed by two, substantially parallel side walls 49 extending downwardly in FIG. 6d from the base member 51. In this manner as shown in FIG. 6c, a locking pin 53 can then be inserted if desired through the aligned apertures 55 in the side walls 49 of the arm portion 45 and aperture 55' (see FIGS. 6b and 6c) in the free end of the lower leg section 9" to positively lock the free end of the lower leg section 9" in the folded position of FIG. 6c. The compact, folded tripod 3 as in FIG. 6f together with the post member 5 can then be conveniently placed in a transport case, backpack, or duffle bag or carried together manually if desired. The mount 1 in this regard is relatively lightweight (e.g., 20-40 pounds and more preferably about 25 pounds) and can be easily transported by one person. The lower leg section 9" if desired could also be foreshortened to be swung under the central member 11 with the foot pad 7 still attached.

Figure 7:
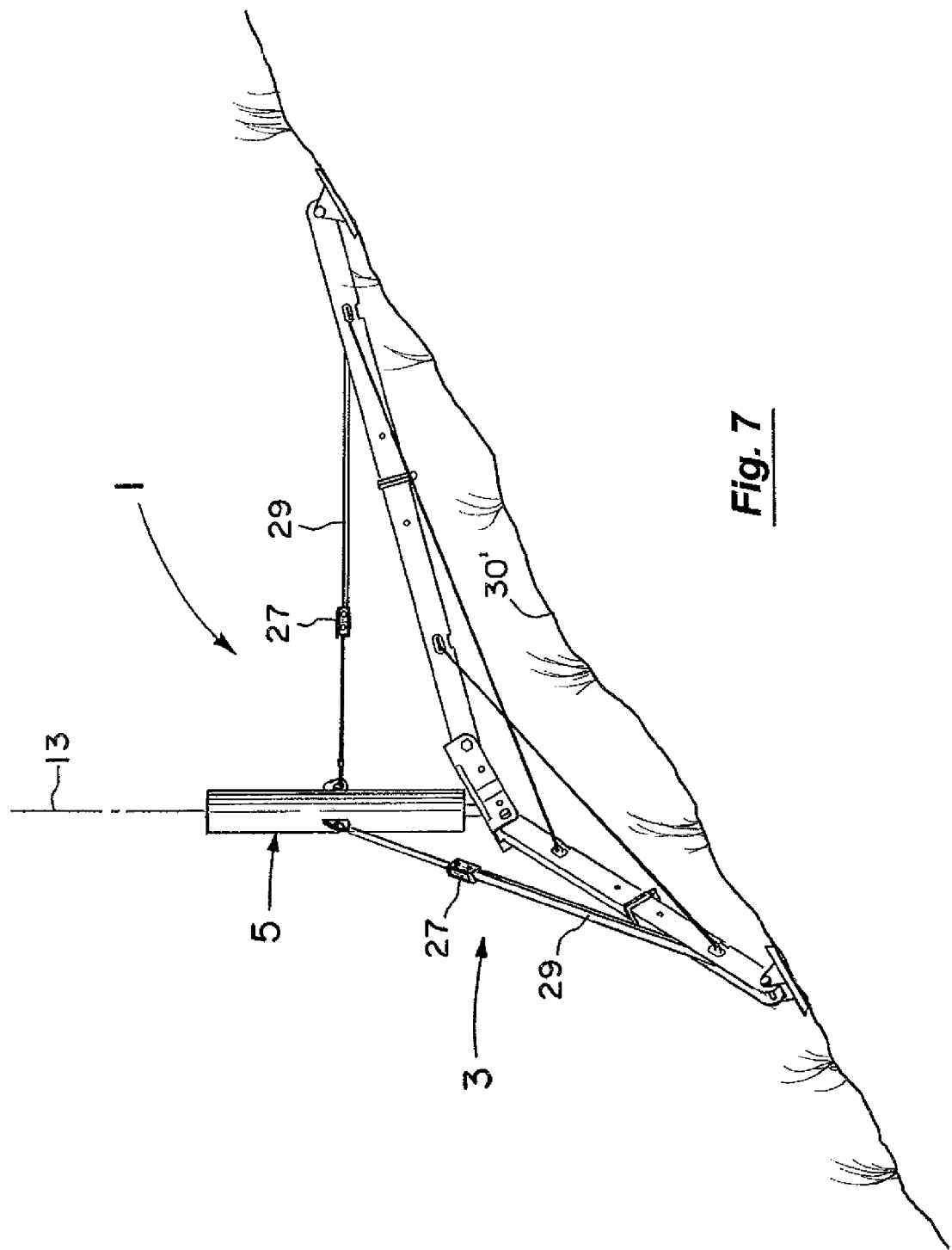
FIG. 7 is a view of the deployed mount of the present invention on a rough and inclined surface with the longitudinal axis of the post member adjusted and supported to be vertical for attachment of a satellite dish antenna system.

FIG. 7 illustrates the versatility of the mount 1 of the present invention wherein the tripod 3 of the mount 1 can be positioned on an uneven surface such as 30' and the axis 13 of the elongated post member 5 adjusted to be vertical. With the axis 13 vertical as discussed above, the alignment system of the attached satellite dish 2 of FIG. 1 will then have a proper reference from which to aim or direct the dish 2 (e.g., azimuth and elevation) for best reception and transmission. More specifically as shown in FIGS. 8a-8d and FIGS. 9a-9d, the lower section 5" of the elongated post member 5 has a universal joint or pivot mechanism 21 attached to it. The universal joint or pivot mechanism at 21 allows the post member 5 to be pivoted about the two, substantially perpendicular axes 61 and 63 of FIG. 8a to virtually any desired position to align the axis 13 of the post member 5 vertically. This is the case regardless of whether the supporting surface is substantially horizontal and flat such as 30 in FIG. 2a or inclined and uneven such as 30' in FIG. 7. As a practical matter and although the post member 5 can be universally moved, the post member 5 is normally adjustable on inclined surfaces up to about plus/minus 30 degrees and secured in place for the satellite dish antenna system or other mobile electronic device to be placed on the post member 5. In this regard, co-owned U.S. patent application Ser. No. 12/603,843 filed Oct. 22, 2009 shows such a mobile electronic device and in particular, a satellite antenna system that can be employed with the mount 1 of the present invention. This application is hereby incorporated herein by reference.

In the illustrated position of FIG. 8a, the mount 1 is shown as it would appear on a flat, horizontal surface wherein the longitudinal axis 13 of the post member 5 is aligned and essentially collinear with the central axis 43 of the central member 11. However, to the extent the bubble 15 of the built-in level at the upper section 5' of the post member 5 is not centered, the post member 5 can be pivoted to the desired position about one or both of the pivotal axes 61,63 to center the bubble 15. The level is shown affixed inside the upper section 5' of the post member 5 (see also FIG. 9d) with the bubble 15 aligned with the longitudinal axis 13 but it could be mounted along the outside of the post member 5 if desired.

Figure 10A:
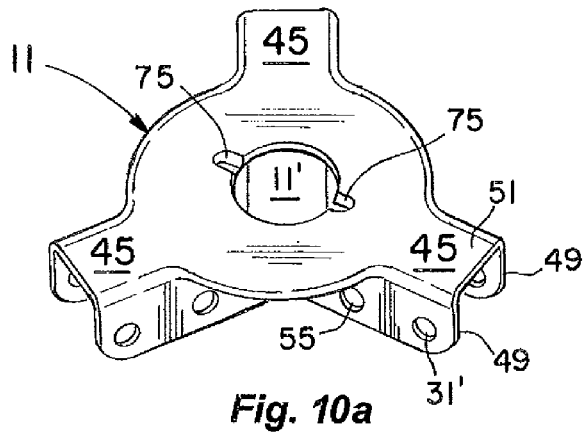
FIGS. 10a-10e show further details of the central member of the tripod on which the post member is supported.
Figure 10C:
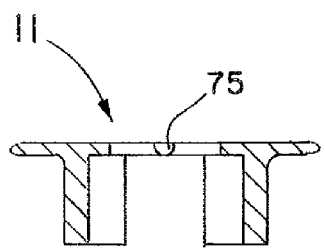
Figure 10D:
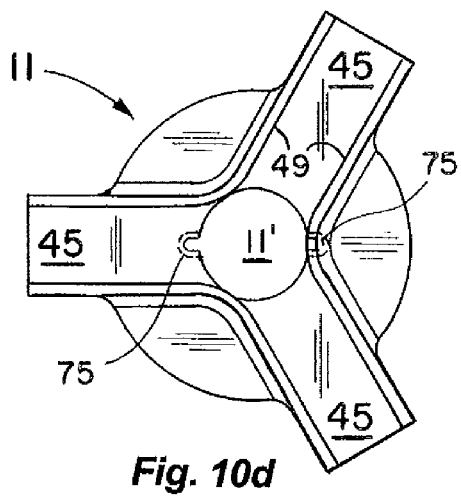

With the bubble 15 centered, the adjustable length straps 29 as discussed above and as shown in FIGS. 1-2b and 7 can then be adjusted and tightened at 27 by a ratchet, turnbuckle, adjustable clamp, or similar device to securely hold the post member 5 in the desired position. Each strap 29 in this regard is attached as shown (e.g., see FIGS. 1 and 2a) to the respective lower section 9" of each leg 9 at a first location along the lower section 9" and to the elongated post member 5 at a second location along the longitudinal axis 13 thereof. In this manner, the elongated post member 5 can be selectively moved (e.g., manually) relative to the central member 11 of the tripod 3 about the first and second pivotal axes 61,63 of the pivot mechanism 21 to the desired position relative to the central member 11 and secured in place by the tightening devices 27. The universal joint or pivot mechanism 21 could be of a number of designs but is illustrated in FIGS. 8a-8d and 9a-9d as having a first pivot member 65 (FIGS. 8b-8c) which extends along the first pivotal 61 axis and includes a first pivot pin with end sections 67 (see also the cross-sectional view of FIG. 9d). The end sections 67 as shown extend outwardly on either side of the central nut section 67'. The pivot mechanism 21 then has a yolk 69 (FIG. 8c) attached to the lower end section 5" of the post 5 (see also the cross-sectional view of FIG. 8d) with shoulder bolts 71 secured in the yolk legs 69' (FIG. 8d) and with a cross pin 73 extending therethrough. The yolk 69 and attached post member 5 can be pivoted about the second pivotal axis 63 relative to the first pivot member 65 with the yolk legs 69' (FIGS. 8c and 8d) rotating relative to the nut section 67' of the first pivot member 65. As indicated above, the end sections 67 of the pivot pin of the first pivot member 65 extend outwardly on either side of the central nut section 67' as perhaps best seen in the cross-sectional view of FIG. 9d. These end sections 67 in turn are received and supported in the recesses 75 in the central member 11 of the tripod 3 (see FIGS. 8a and 10a).

Figure 10B:
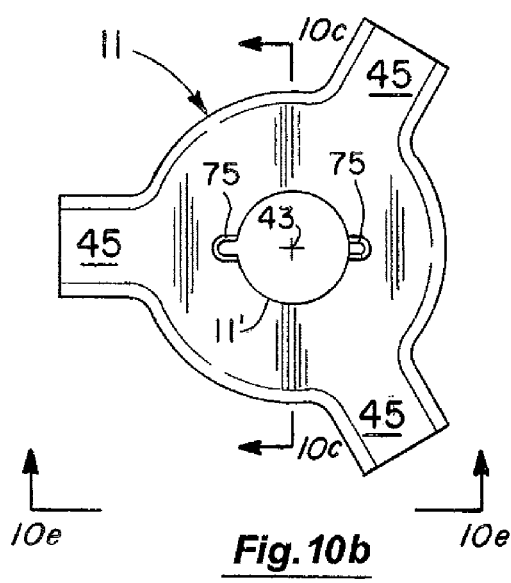
Figure 10E:
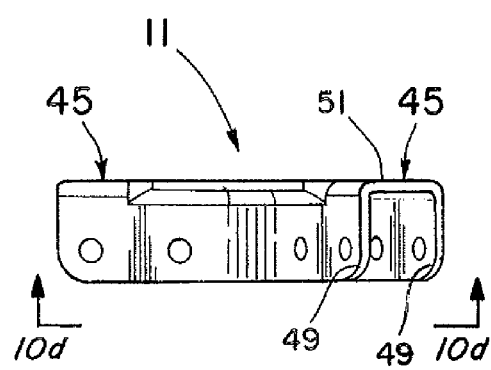

The upwardly facing, open recesses or slots 75 (FIGS. 10a-10b) are axially aligned on opposite sides of the central opening 11' in the central member 11 and support the end sections 67 of the pivot pin of the first pivot member 65. In this position, the pivotal axis 61 of the first pivot member 65 (FIG. 8a) is supported in a predetermined and substantially fixed position relative to the central member 11 of the tripod 3. The pivot mechanism 21 is preferably attached to the lower end section 5" of the post member 5 with the end sections 67 of the pivot pin of the first pivot member 65 removably supporting the post member 5 on the central member 11. However, the pivot mechanism 21 could be part of the central member 11 and the post member 5 then removably attached to the pivot mechanism 21 if desired.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims. In particular, it is noted that the word substantially is utilized herein to represent the inherent degree of uncertainty that may be attributed to any quantitative comparison, value, measurement or other representation. This term is also utilized herein to represent the degree by which a quantitative representation may vary from a stated reference without resulting in a change in the basic function of the subject matter involved.

I claim:

1. A foldable tripod (3) for a satellite dish antenna system, said foldable tripod including:

a central member (11) extending substantially about a first central axis (43) and having three arm portions (45) extending outwardly of the first central axis (43) in respective deployed positions along respective second axes (47), said second axes (47) being substantially perpendicular to the first central axis (43) and being spaced from each other substantially 120 degrees about the first central axis (43), each of said arm portions having at least two, substantially parallel side walls (49) spaced from each other, each of said arm portions (45) respectively having an elongated support leg (9) attached thereto, each elongated support leg having an upper and lower elongated section (9',9") with the respective upper section thereof attached to the respective arm portion (45) of the central member (11) for pivotal movement about a respective third axis (33), each respective third axis (33) passing through the respective side walls (49) of the respective arm portion (45) and extending substantially perpendicular to the respective second axis (47), said upper section (9') at the respective third axis (33) being received between the respective side walls (49) of the respective arm portion (45), the upper and lower sections of each support leg being mounted to each other for pivotal movement about a respective fourth axis (37), said third and fourth axes (33,37) being substantially parallel to each other, each lower section (9") of each support leg having a free end spaced from the respective fourth axis (37), each elongated support leg (9) being movable from an extended position with the upper and lower elongated sections (9',9") thereof substantially aligned with each other along a common fifth axis (41) and respectively extending away from the fourth axis (37) and away from each other axially along said common fifth axis and a retracted position with the respective lower section (9") pivoted about the respective fourth axis (37) to be substantially parallel to the upper section (9') with the free end of the lower section (9") received between the side walls (49) of the respective arm portion (45) and said upper and lower sections (9',9") extending substantially parallel to the first central axis (43) of the central member (11) of the tripod (3).

2. The foldable tripod of claim 1 wherein each arm portion (45) has a substantially inverted, downwardly facing U-shape formed by a base member (51) with the two substantially parallel side walls (49) extending downwardly away from the base member (51) to form the inverted U-shape and each arm portion (45) further has an aperture (55) in each side wall (49) of each inverted-U-shape and said free end of each respective lower section (9") has an aperture (55') therethrough wherein the aperture (55) of each side wall (49) of the respective arm portion (45) and the aperture (55') of the lower section (9") can be aligned to receive a locking pin (53) therethrough to retain the respective lower section (9") in said retracted position with the upper and lower sections (9',9") extending substantially parallel to each other and the first central axis (43) of the central member (11) of the tripod (3).

3. A foldable tripod (3) for a satellite dish antenna system, said foldable tripod including:
a central member (11) extending substantially about a first central axis (43) and having three arm portions (45) extending outwardly of the first central axis (43) in respective deployed positions along respective second axes (47), said second axes (47) being substantially perpendicular to the first central axis (43) and being spaced from each other substantially 120 degrees about the first central axis (43), each of said arm portions having at least two, substantially parallel side walls (49) spaced from each other,
each of said arm portions (45) respectively having an elongated support leg (9) attached thereto, each support leg having an upper and lower section (9',9") with the respective upper section thereof attached to the respective arm portion (45) of the central member (11) for pivotal movement about a respective third axis (33), each respective third axis (33) passing through the respective side walls (49) of the respective arm portion (45) and extending substantially perpendicular to the respective second axis (47), said upper section (9') at the respective third axis (33) being received between the respective side walls (49) of the respective arm portion (45), the upper and lower sections of each support leg being mounted to each other for pivotal movement about a respective fourth axis (37), said third and fourth axes (33,37) being substantially parallel to each other, each lower section (9") of each support leg having a free end spaced from the respective fourth axis (37), each support leg being movable from an extended position with the upper and lower sections (9',9") substantially aligned along a fifth axis (41) and a retracted position with the respective lower section (9") pivoted about the respective fourth axis (37) to be substantially parallel to the upper section (9') with the free end of the lower section (9") received between the side walls (49) of the respective arm portion (45) and said upper and lower sections (9',9") extending substantially parallel to the first central axis (43) of the central member (11) of the tripod (3) and wherein each arm portion (45) has a substantially inverted U-shape formed by a base member (51) with the two substantially parallel side walls (49) extending away from the base member (51) to form the inverted U-shape wherein the upper section of each leg (9) at the respective third axis (33) is received within the inverted U-shape of the respective arm portion (45) and the free end of each lower section (9") in the respective retracted position is received within the inverted U-shape of the respective arm portion.

4. The foldable tripod of claim 1 further including at least two cable members (23) respectively extending between the lower section (9") of each leg (9) and the upper section (9') of each of the other legs (9).

5. A mount for a satellite dish antenna system, said mount including a tripod (3) and an elongated post member (5),
said tripod (3) having a central member (11) extending substantially about a first central axis (43) and having three elongated support legs (9) attached to said central member (11) for pivotal movement about respective pivotal axes (33) substantially perpendicular to said first central axis (43), said legs (9) respectively extending outwardly of said first central axis (43) in respective deployed positions along respective second axes (41) and having respective upper and lower sections (9',9"),
said second axes (41) being spaced from each other substantially 120 degrees about said first central axis (43),
said elongated post member (5) extending along a longitudinal axis (13) between upper and lower sections (5',5"), said upper section (5') being attachable to the satellite dish antenna system and said lower section 5" having a pivot mechanism (21) attached thereto, said pivotal mechanism (21) supporting said post member (5) for movement about two, substantially perpendicular pivotal axes (61,63) relative to the central member (11) of the tripod (3), said pivot mechanism (21) including a first pivot member (65) extending along said first pivotal axis (61) between first and second end sections (67), said first and second end sections (67) being mountable on said central member (11) of the tripod (3) to support the first pivot member (65) with the first pivotal axis (61) thereof in a substantially fixed position relative to the central member (11) of the tripod (3),
said tripod (3) further including at least three elongated members (29) respectively extending between the lower section (9") of each leg (9) and the elongated post member (5), said elongated members (29) being attached to the respective lower section (9") of each leg (9) at a first location along said lower section (9") and attached to the elongated post member (5) at a second location along the longitudinal axis (13) thereof, each elongated member (29) being adjustable in length by a tightening device (27) wherein said elongated post member (5) can be selectively moved relative to the central member (11) of the tripod (3) about said first and second pivotal axes (61,63) of said pivot mechanism (21) to a desired position relative to said central member (11) and secured in said desired position by said elongated members (29) and tightening devices (27).

6. The mount of claim 5 wherein said central member (11) has a central opening (11') extending about the first central axis (43) and has axially aligned, upwardly facing recesses (75) on opposite sides of said opening (11') to receive and support the respective first and second end sections (67) of the first pivot member (65) therein with the first pivotal axis (61) of the pivot mechanism (21) in a fixed position relative to the first central axis (43) of the central member (11) of the tripod (3).

7. The mount of claim 6 wherein said first and second end sections (67) rest on said central member (11) in said respective recesses (75) wherein said first pivot member (65) removably supports said elongated post member (5) on said central member (11) of the tripod (3).

8. The mount of claim 5 wherein said elongated members (29) respectively extending between the lower section (9") of each leg and the elongated post member (5) are flexible straps.

9. The mount of claim 5 wherein said tripod further includes at least two cable members (23) respectively extending between the lower section (9") of each leg (9) and the upper section (9') of each of the other legs (9).

10. The mount of claim 5 further including a level with a bubble (15), said level being affixed to the elongated post member (5) wherein the longitudinal axis (13) of said elongated post member (5) can be axially aligned vertically by selectively moving the elongated post member (5) relative to said central member (11) of the tripod (3) about the first and second pivotal axes (61,63) of the pivot mechanism (21) to center the bubble (15) in the level.

11. The mount of claim 10 wherein said level is affixed inside the upper section (5') of the elongated post member (5)

with the bubble (15) therein substantially aligned with the longitudinal axis (13) of the post member (5).

\* \* \* \* \*